Figure 1:
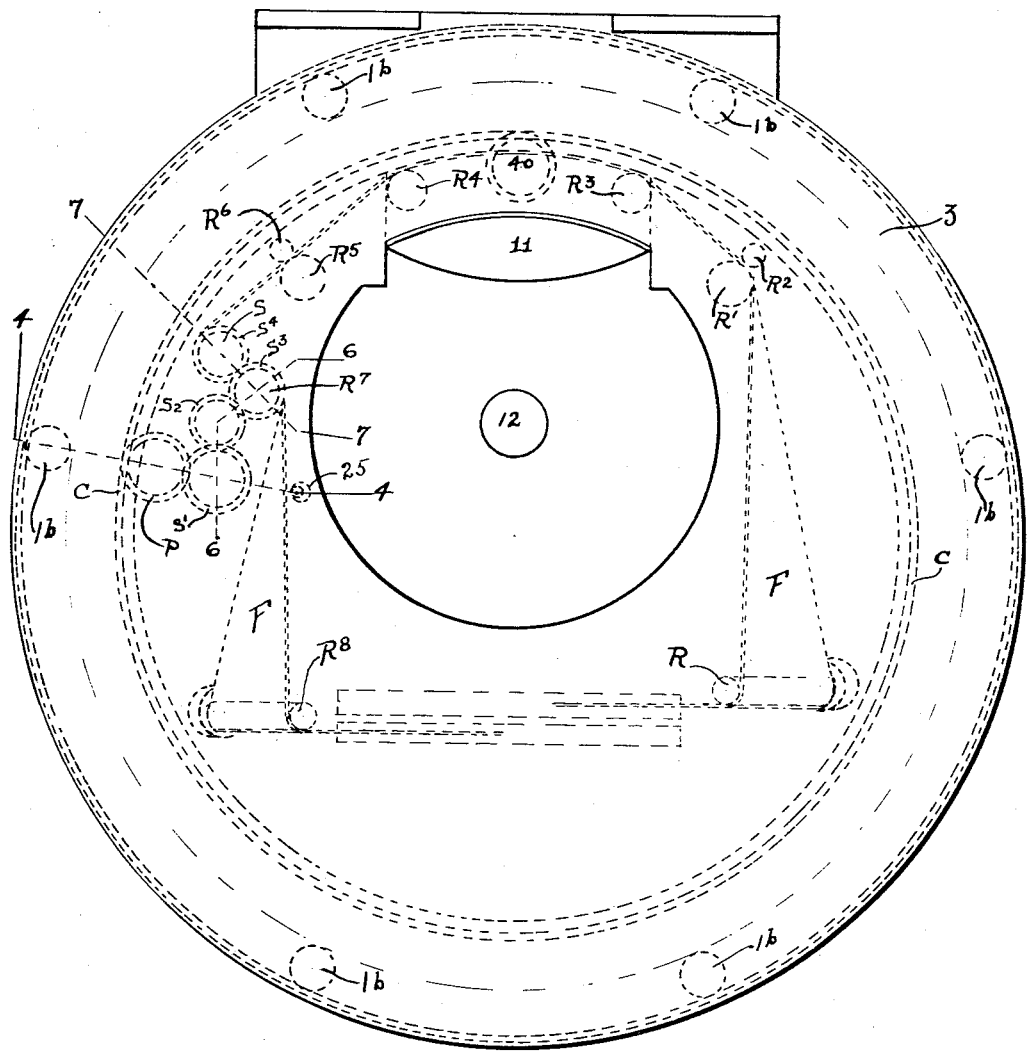

B. A. BRIGDEN.
MULTICOLOR MOVING PICTURE MACHINE.
APPLICATION FILED AUG. 1, 1913.

1,143,608.

Patented June 22, 1915.
5 SHEETS—SHEET 1.

Witnesses

Inventor
Burt A. Brigden
By John A. Bommhardt
Attorney

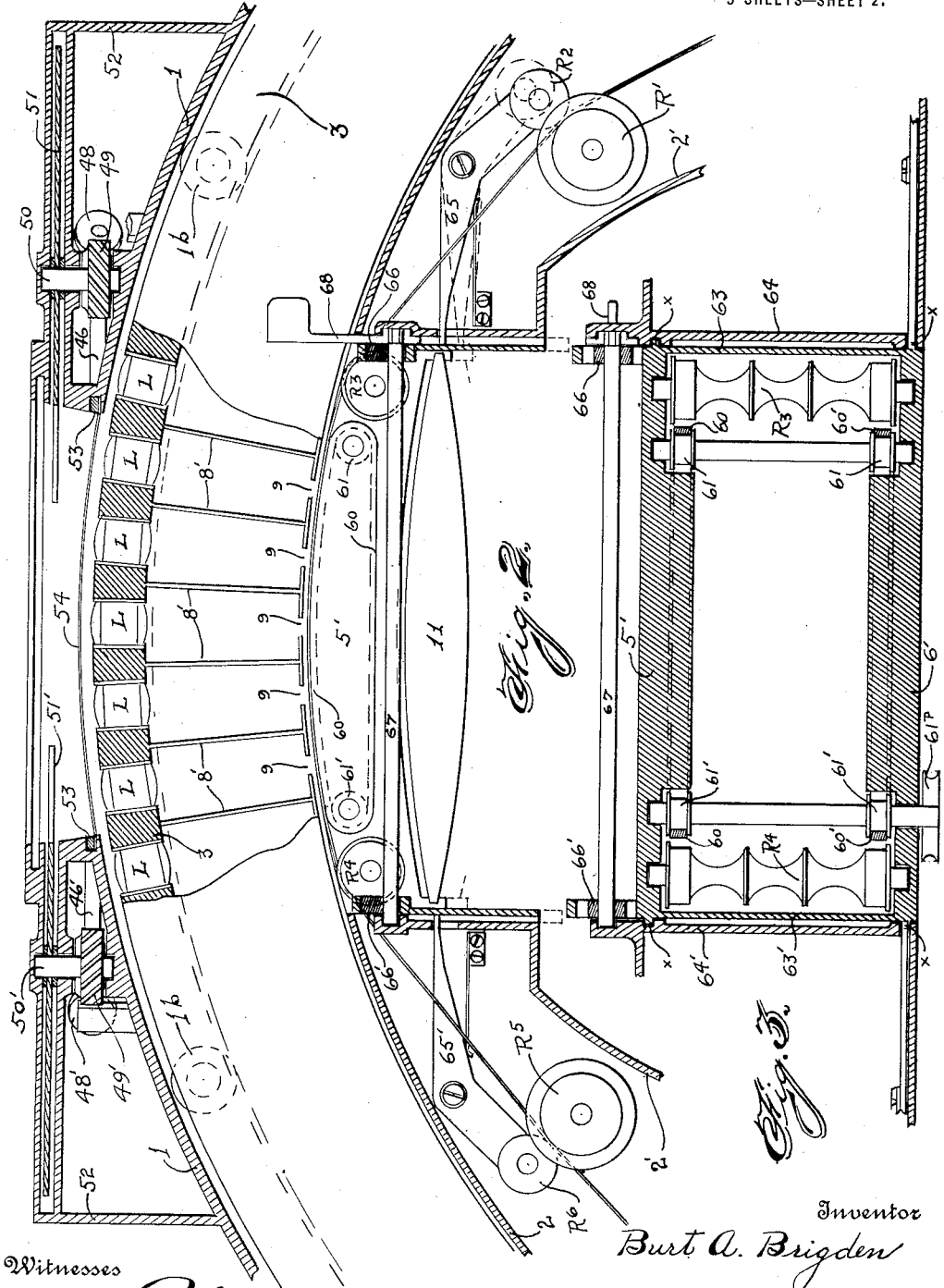

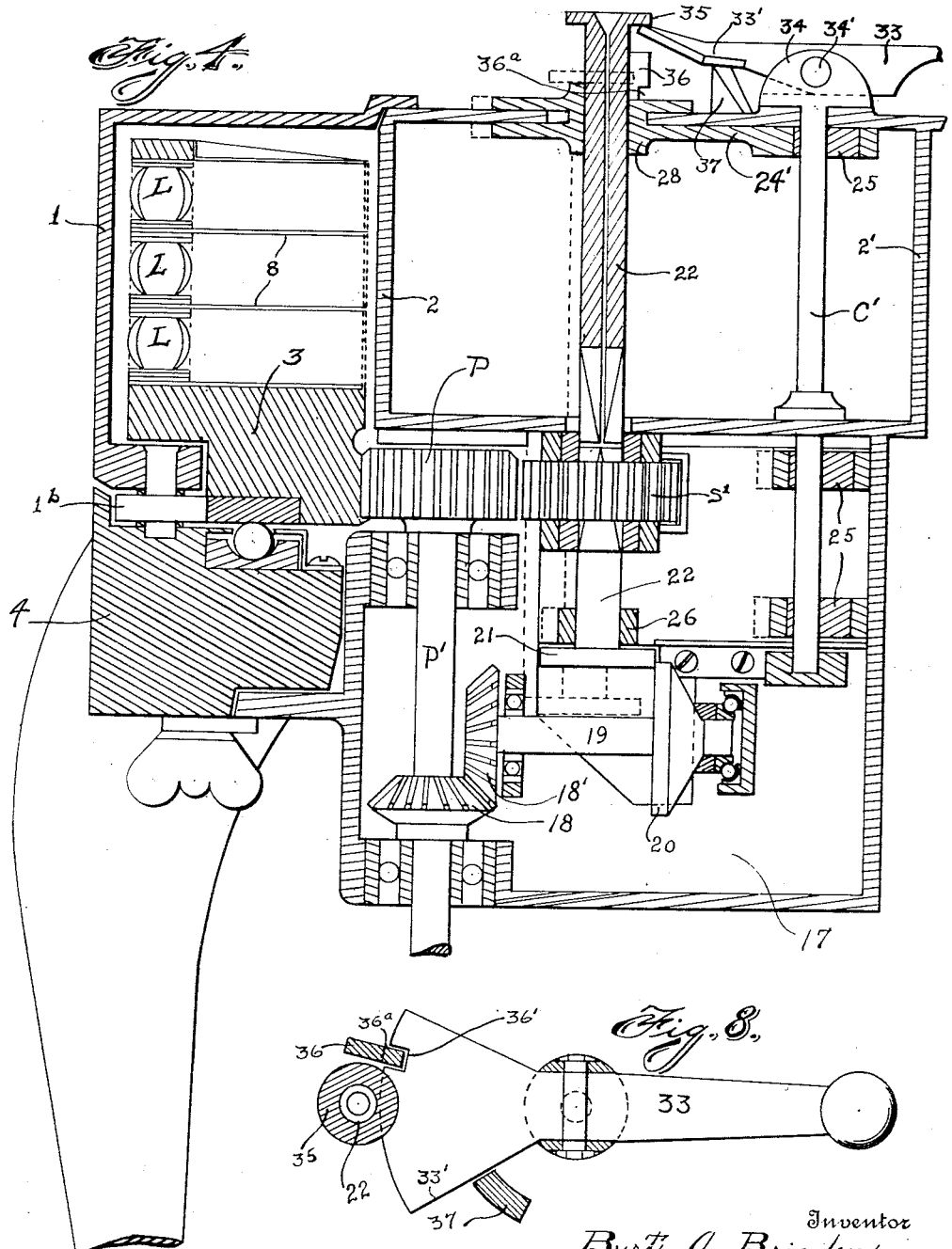

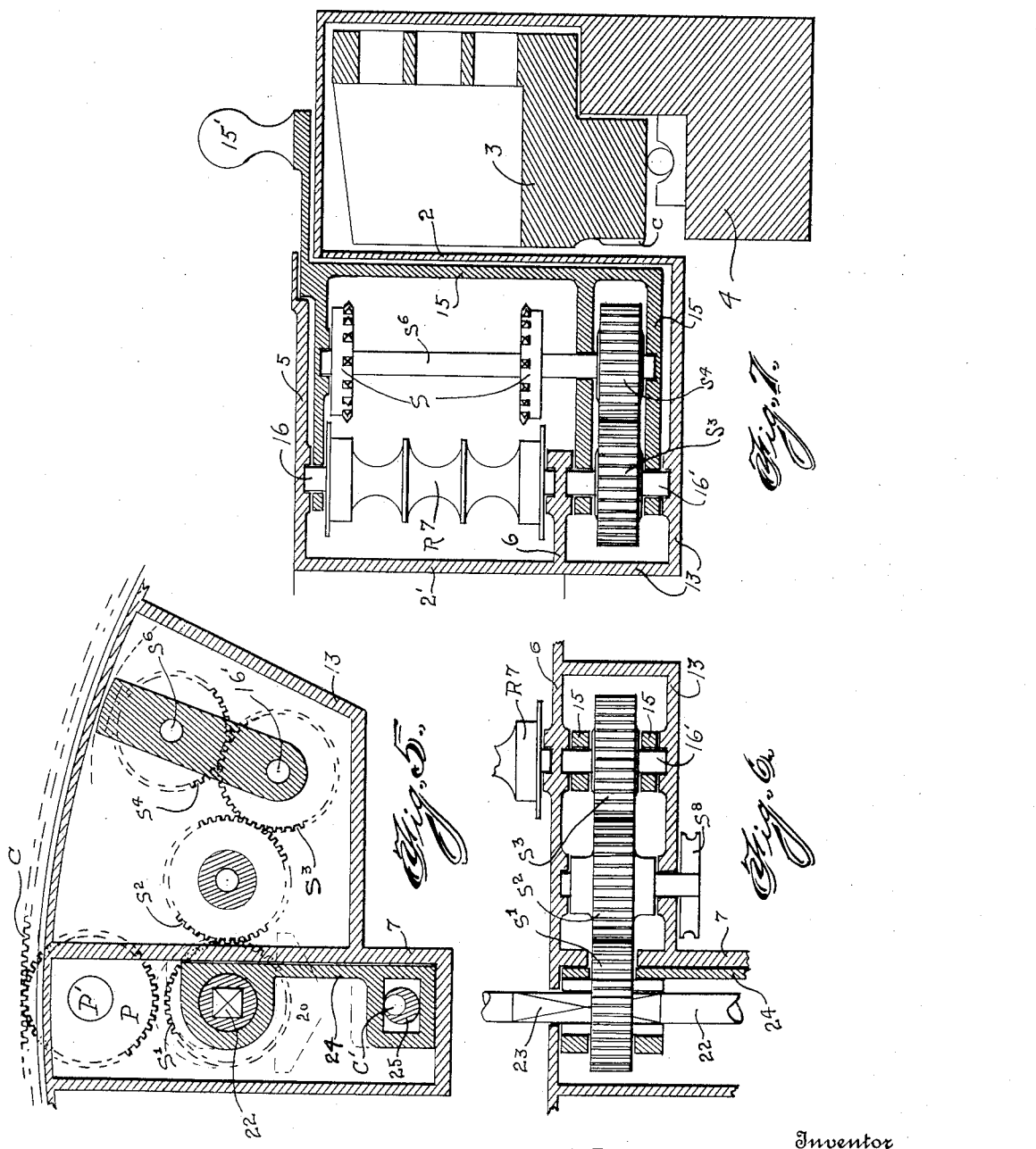

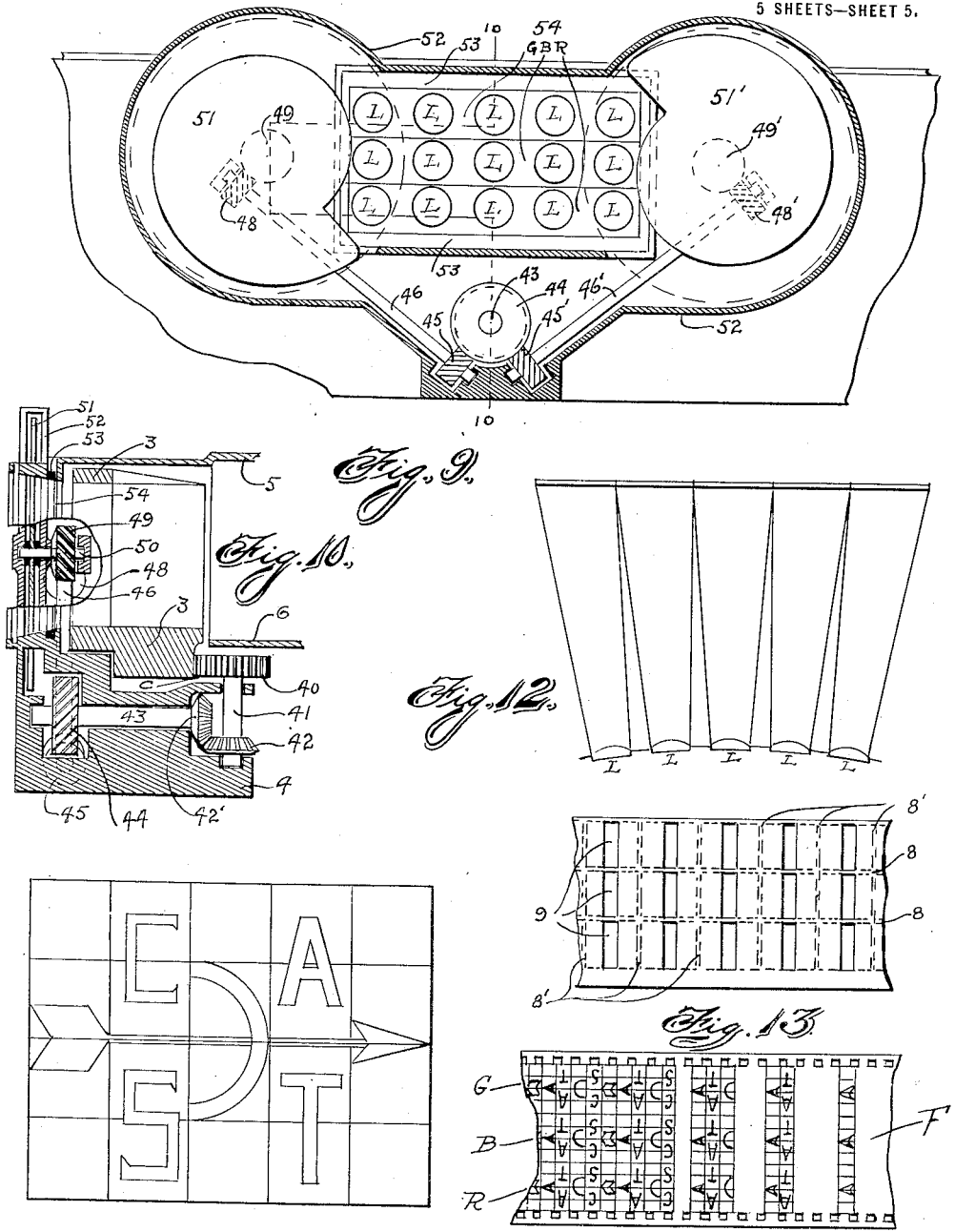

UNITED STATES PATENT OFFICE.

BURT A. BRIGDEN, OF EAST CLEVELAND, OHIO.

MULTICOLOR-MOVING-PICTURE MACHINE.

1,143,608.	Specification of Letters Patent.	Patented June 22, 1915.

Application filed August 1, 1913. Serial No. 782,457.

*To all whom it may concern:*

Be it known that I, BURT A. BRIGDEN, a citizen of the United States, residing at East Cleveland, in the county of Cuyahoga and State of Ohio, have invented certain new and useful Improvements in Multicolor-Moving-Picture Machines, of which the following is a specification.

This invention relates to multi-color moving picture machines. It is illustrated in connection with a projecting machine, but is applicable to recording machines or cameras.

The invention is an improvement on the machine described and claimed in my pending application No. 721250, filed Sept. 19, 1912, the object of the present invention being to produce a machine particularly adapted for multi-color work, and characterized by an absence of flicker by eliminating obscuration, and the production of all colors at all times. In ordinary multi-color machines the colors are produced by the rapid successive projection of the image through colored screens. In the present machine the image is exhibited through different colored screens at the same time, in consequence of which there is an absence of the different colored stripes or color flicker seen especially on rapid moving objects. In the former application, a continuously moving film is employed with a ring or succession of radial objectives traveling in the same direction as the film across the exposure opening, a succeeding objective being brought into operation before the preceding objective ceases to operate. In this improved machine I use a plurality of rings or tiers of radial objectives and a plurality of screens located at the exposure opening through which the image is projected in different colors accordingly, at the same time, producing all parts of the field in the full and true color by a combination or superposition of the rays transmitted through the various screens. Each tier of lenses in projecting throws the image, while passing the exposure opening, through a color screen (G, B or R Figure 9) and as any three lenses in line vertically are covering the same part of the field at the same time, they produce complete color by a blending or superposition of the images projected through the different color screens, colors coming from the different screens, and the same part of view, coming from the lenses that are in vertical alinement. The prior application therefore discloses the broad idea of the film and lens movement and exposure, the present invention being directed to the multi-color feature, as well as to certain improvements in the means for driving the film and lenses and manipulating the same. In the drawings are shown a three color screen and behind it three rings of objectives are provided, instead of the single ring disclosed in the former application.

Various other improvements will be apparent from the following description and the drawings will illustrate one embodiment of the invention.

As disclosed in the former application the film moves with the image of the field and at a faster speed than the lenses, so that successive portions of the film are exposed, producing a complete record, somewhat similar to the action of some types of panoramic cameras, the film being made up of a series of small pictures produced by the successive action of a succession of objectives.

In the drawings—Fig. 1 is a top plan view of the machine. Fig. 2 is a top view, partly in section. Fig. 3 is a vertical section of sliding guide frame shown in Fig. 2. Fig. 4 is a vertical section on the line 4—4 of Fig. 1. Fig. 5 is a horizontal section of part of the film feeding devices, particularly shown in Fig. 4. Fig. 6 is a detail in section on the line 6—6 of Fig. 1. Fig. 7 is a detail in section on the line 7—7 of Fig. 1. Fig. 8 is a top plan of a starting and stopping lever, shown in Fig. 4, and forming part of the film feeding devices. Fig. 9 is a front elevation of machine partly in section. Fig. 10 is a section on line 10—10 of Fig. 9. Figs. 11 and 12 are diagrams illustrating the field and the lens action. Fig. 13 is an elevation showing the exposure slits or openings in the lens carrier. Fig. 14 is a plan or diagram of part of the film showing the progress of the exposure.

Referring specifically to the drawing L indicates successive lenses or objectives arranged in three rows or rings, one directly above the other, with the axes of the lenses parallel.

11 is the condensing lens behind which is a source of light 12 when used for projecting.

3 is an annular lens carrier which runs on ball bearings on a base 4 forming part of an annular casing which includes an outer wall 1 and an inner wall 2 and a further inner wall 2' which forms a central well for the source of light and a chamber between the walls 2 and 2' for the film and its feeding mechanism.

8' are division walls in the lens carrier between the respective tiers and series of lenses, and 9 are exposure slots corresponding to the axes of the lenses (see Figs. 2 and 13).

The lens carrier runs in contact with guide rollers $1^b$, and the lens carrier is provided with an internal gear C, being driven by a gear P on a power shaft P' driven by any suitable motor, giving movement to the lens carrier in the casing. The respective tiers of lenses are located behind screens 54, marked G, B, R, representing colors which produce white light when combined. These color screens are mounted in a frame 53 which is removable from the casing, permitting an operator with a variety of combinations to use his judgment as to the proper combination for any given subject.

The film F will be supplied from suitable reels (not shown) to the film chamber between the casing walls 2 and 2', and passes over guide rollers R, R' ... $R^8$ and the feeding sprocket S which is driven from the power shaft by the gears S', $S^2$, $S^3$, and $S^4$ so as to travel in the same direction as the lens carrier, and at a speed somewhat faster to bring new portions of the film into action during the exposure in recording, the speed of the film being equal to the speed of the image of the field resulting from the angular movement of the lenses, so that the new portions of the film will constantly come into position for exposure and will follow the figure of the field that it first picks up until it has passed outside of the limited scope of the lens, viz: the rays admitted through the slots 9.

The lens carrier is comparatively heavy and therefore not quickly started or stopped, consequently means are provided to quickly start and stop the film while the carrier is in motion.

Referring particularly to Fig. 4, 17 is a chamber containing the transmission gearing of the film feeding device. On the power shaft P' is a beveled gear 18 driving gear 18', shaft 19 and a friction disk 20. Gear S' is mounted on a sliding shaft 22 which is squared where it passes through the gear. This shaft is mounted in bearings 26 and 28 so that it can be raised and lowered. These bearings are respectively mounted on plates 24 and 24' which are slidable in the gear chamber toward and away from the power shaft P', and the plates are operated by cams 25 on a shaft C' as shown in Figs. 4 and 5. On the lower end of shaft 22 is fixed a friction disk 21 which by movement of the shaft may be thrown in or out of contact with the disk 20 and also moved across the face of said disk to vary the speed. The operating lever 33 is pivoted at 34', between flanges 34, to the upper end of the shaft C', and by turning the lever in a horizontal plane the cams are operated to shift the shaft 22 laterally and thereby bring the disk 21 in or out of contact with the disk 20. The pivotal connection at 34' permits the lever 33 to be raised or lowered. The end 33' of this lever is inclined and fan shaped and engages under a flange 35 on the shaft 22, whereby said shaft may be raised or lowered. To start the film slowly, the fan shaped end of the lever 33 is depressed, and the lever can be turned in the notch $36^a$ which turns the cams and brings the disk 21 against the disk 20 near the axis thereof. This starts the film feeding gear slowly. When turned to full extent the lever strikes a stop 37 with the notch 36' under the projection 36, which permits the fan shaped end of the lever to be raised thereby lifting the shaft 22 as shown in Fig. 4 until the disk 21 is near the periphery of the disk 20, thereby increasing from slow to full speed. 33' can now pass 37 and the gear S' can be moved to mesh with P, giving exact relative movement of film with carrier.

The sprocket shaft $S^6$ is carried by a swinging frame 15 which is pivoted on the shafts 16 and 16' of the guide roller $R^7$ and the gear $S^3$ respectively, and this frame may be turned by a handle 15', to permit of threading the film on the sprocket in any position and at the same time properly register the relative positions of the film and lenses so that the picture may be properly placed or framed on a screen. By operating the handle 15' the feeding sprocket is swung one way or the other for this purpose. This adjustment is desirable in projecting, but is not necessary when the machine is used as a camera.

At the exposure opening the film passes over small belts 60 and 60', Figs. 1 and 9, flat on the side next to the film, and these pass over rollers 61 and 61' and travel with the motion of the film, saving wear of the latter on the upper and lower plates 5' and 6'.

$61^p$ is a pulley wheel which may be driven by a cord belt to a similar pulley $S^8$ on the lower end of the shaft of the gear $S^2$, to drive the rollers 61 and 61' and the belts 60 and 60'. The shafts of these rollers turn in bearings in upper and lower plates 5' and 6', connected by plates 63 and 63' which have tongues X which slide in grooves in the plates 64 and 64' integral with the top and bottom plates 5 and 6 of the chamber. This permits sufficient forward and backward movement of the rollers and belts to allow easy threading of the film in loading the machine, and when used for projecting, permitting an adjustment to compensate for any shrinkage or contracting of film caused in developing and reproduction. The sliding movement of the frame comprising the plates 5' and 6' and the connecting walls 63 and 63' may be effected as shown or by any suitable device.

65 and 65' are levers carrying guide rollers R² and R⁶ and they operate when the machine is opened by swinging these rollers outside of the flanges of the rollers R' and R⁵, so that the film may be easily removed or dropped in place.

66 and 66' are cams on the shaft 67, and 68 is a lever which turns the shaft and the cams and produces the forward or backward movement of the sliding frame above referred to.

The shutter mechanism is similar to that disclosed in the above entitled application. The shutters 51 and 51' may have an outline corresponding to that fully described in said application. They are mounted on shafts 50 and 50' which are driven from the carrier gear C by means of gear 40, shaft 41, gears 42 and 42', shaft 43, gear 44, gears 45 and 45', shafts 46 and 46' and gears 48 and 48' meshing with gears 49 and 49' (Figs. 9 and 10) on the shutter shafts 50 and 50'. These shutters are used to cause the picture to start and end abruptly without loss of space, and they could be omitted with a slight vignetting at each end of each picture. As stated in the former case they cause a slot to progressively travel across the exposure opening, cutting off the ends of the exposure opening as they revolve.

The image is produced through the slots 9 in the lens carrier, in three tiers, as shown in Fig. 13, corresponding to the tiers of lenses and the color screens through which said tiers are respectively exposed, and the travel of the film and the lenses produces a succession of built up pictures as the lenses travel across the field, each lens gradually picking up all parts of the image or picture so that a succession of small pictures is produced, each having a length corresponding to the beginning and ending of the action of each lens, passing the exposure opening.

As shown in Fig. 9, there are fifteen lenses operative at the same time, three tiers, each containing five lenses, those in line vertically are parallel and operating on the same part of the field at the same time and through different colored screens. The radial lenses of each tier are operating on separate adjoining sections of the field (as illustrated in Fig. 12) limited by the slots 9 (Fig. 13) through the same color screens (G, B or R Fig. 9) to collectively secure records which by projection produce a complete image of the field.

If the axis of a lens were parallel in its different positions while passing the exposure opening, then the part of the field recorded by it would not change materially, but inasmuch as the lenses are radial as shown in Fig. 12, it records a different part of the field, constantly changing as it crosses the exposure opening and if the image of the field (formed by the moving lens), and the film, move in exact unison it will produce a sharp, clear record; to explain, the lenses at the right at the instant shown in Fig. 12, will record the arrow head section of the field, shown in plan in Fig. 11 (field being shown in section in Fig. 12) and the image will appear as shown at the right in Fig. 14—the arrow head only. These lenses (three in vertical alinement) as they move with a continuous and uniform motion across the exposure opening bring new detail in line with the optical axes and the image moves uniformly to the left relatively to the axes of the lenses and to their slots, and at the instant of passing the second position shown in Fig. 12, the section containing the letters A, T, is the only part of the field passing the slots (shown in Fig. 13) of these lenses and being recorded on the film, but the section containing the arrow head has already been recorded by these lenses and at this instant is being recorded again by the succeeding lenses. The image moves faster than the slot because of the angular movement of the radial lenses, and the film must have exactly the same movement as the image. After it passes the slot, the exposed film is protected by the opaque walls between the slots, until it passes the exposure opening to a suitable light tight receiving reel.

If one lens without a slot should record the field in Fig. 11, it would show an image five blocks long, but if five lenses collectively are to produce this record, each lens must secure, or record, only one fifth or one section and must do this at the same instant, and the slot must be sized to permit the proper angle of view to pass.

The protected part of the film which is being exposed by the lens in the fourth position, has come up to the completed exposure of the record preceding it, at the instant that the shutter stops the light from the lens which has produced it, and which has finished its transit across the exposure opening; consequently it is protected from mal-exposure as it gradually passes under the preceding slot. So, the first lens, at the right, Fig. 12, is recording the first section of the field. When said lens has moved to the next position shown, the film will have moved so much faster that its first section (containing the arrow head) is then behind the opaque wall at the left of the slot behind said lens. When the lens reaches third position, the first and second sections of the film will then be behind the wall; when it reaches fourth position (field containing C—S) the first, second and third sections of the film will be behind the wall; and when it reaches fifth position (to record the tail of the arrow) the preceding fourth section of the film will have passed to the left beyond the range of the exposure opening in the casing. No blur of the record occurs during its uniform and continuous movement in passing the different positions shown, because, as stated, the film travels at the same speed, or apparent speed, as the image, incident to the angular movement of the lenses. The shutter blades 51 and 51' in Fig. 9 are thin opaque plates, the outer edges of which are in the form of a spiral curve beginning and ending on the same meridian, and the edge on this meridian of each blade forms an inset or offset equal to the radial spacing of the lenses. One shutter blade revolves at such speed that the increasing radius to its outer edge follows the movement of the lenses in the rotary carrier. When its greatest radius passes the exposure opening the inset or step causes the following lenses to be uncovered and again the increasing radius follows in the same manner each succeeding color combination of three lenses. The opposite shutter blade revolves in such manner that the radius constantly decreases and its outer edge recedes as lenses approach until the step or offset covers a combination of lenses and again recedes to its smallest radius followed by the next combination which is covered, and this operation continues while the lens carrier is in motion.

The shutters revolve once during the movement of lenses from one position to that occupied by the preceding lenses, or about eight times per second.

Records made with the shutter in operation will show complete clear detail to the edges and can be projected without a shutter. If records are made without a shutter and no more space between the slots is arranged for (as by setting lenses in a carrier of large circumference) each record will overlap the ones adjoining it. If the lenses of the same angular scope should be set in a carrier of larger diameter and spaced the same degrees apart then there will be more space between the slots and no injury to adjoining records, but more film would be used for the same result, causing waste.

The slight parallax incident to the different vertical positions of the tiers of lenses may be disregarded as it is far within the parallax permissible without producing blur in the image.

In projecting, every part of the field is shown in the true color at each instant, as each row of lenses is producing or reproducing through its screen continuously, and the picture is built up of the different colored views projecting through the appropriate screen and parts of the film by the corresponding tiers of lenses.

Changes may be made in mechanical structure, and also in the number of tiers of lenses, within the scope of the invention.

As will be seen from Fig. 14 the film F contains rows G, B and R of pictures having appropriate color values corresponding to the screens, and with the advantage that all color values are represented on the same film, and consequently registration is absolute.

What I claim as new is:

1. In a moving picture apparatus, the combination of a traveling film, means for advancing the film and means to record a field in different color representations on different parts of said film, said means including different color screens located opposite different parts of said film at the exposure opening, and a series of rows of traveling objectives movable across the exposure opening, each row corresponding in position to one of the color screens and means for moving the objectives.

2. In a moving picture apparatus, the combination of a rotary carrier having rows of slots, a series of rows of lenses carried by said carrier and corresponding to the slots in position, means for rotating the carrier, a color screen corresponding to each row of lenses, and means for supporting and advancing a traveling picture strip in position for exposure through said lenses and slots successively.

3. In a moving picture apparatus, the combination of a rotary carrier, means for rotating the carrier, a succession of objectives arranged in different rows thereon and in the same number and relative position in the respective rows, the carrier having exposure slots corresponding to the objectives in position, different color screens through which the respective rows of objectives operate, and means for supporting and advancing a traveling picture strip in position for simultaneous exposure of different parts thereof through the respective rows of slots and objectives.

4. In a moving picture apparatus, means for feeding a film comprising a feed roller or sprocket, a driving gear for the same including a shaft, a friction driven disk thereon, a friction driving disk, and means to shift the shaft to engage or disengage the disks, or to move the driven disk toward or from the center of the driving disk.

5. In a moving picture apparatus, means for feeding a film comprising a feed roller, a sliding frame, a shaft shiftable laterally with the frame and longitudinally in the frame, gearing between said shaft and the feed roller, a lever operatively connected to the frame and the shaft and movable in one direction to shift the frame and in another direction to shift the shaft, a driving shaft and friction gears operatively connecting the driving shaft and the shiftable shaft one of which gears is carried by the shiftable shaft and is movable therewith, for the purposes stated and the other of which is carried by the driving shaft.

In testimony whereof, I do affix my signature in presence of two witnesses.

BURT A. BRIGDEN.

Witnesses:
JOHN A. BOMMHARDT,
J. B. DAVIS.